(12) United States Patent
Hwang

(10) Patent No.: US 6,242,521 B1
(45) Date of Patent: Jun. 5, 2001

(54) GOLF BALLS COVER COMPOSITIONS

(75) Inventor: In Hong Hwang, Seoul (KR)

(73) Assignee: Volvic Inc., Chungcheongbuk-Do (KR)

( * ) Notice: Subject to any disclaimer, the term of this patent is extended or adjusted under 35 U.S.C. 154(b) by 0 days.

(21) Appl. No.: 09/162,921

(22) Filed: Sep. 29, 1998

(30) Foreign Application Priority Data

Jul. 23, 1998 (KR) .................................................. 98-29602

(51) Int. Cl.$^7$ .............................. A63B 37/12; C08L 33/02

(52) U.S. Cl. .......................... 524/413; 524/783; 525/63; 525/185; 525/187; 525/190; 473/373; 473/385

(58) Field of Search ..................................... 473/373, 385; 524/413, 783; 525/63, 185, 187, 190

(56) References Cited

U.S. PATENT DOCUMENTS 5,779,561 * 7/1998 Sullivan .
6,015,356 * 1/2000 Sullivan .

OTHER PUBLICATIONS

Billmeyer, *Textbook of Polymer Science* p. 5; 1984.*
Encyclopedia of Polymer Science and Engineering vol. 12 p. 1.*

* cited by examiner

*Primary Examiner*—David J. Buttner
(74) *Attorney, Agent, or Firm*—Amster, Rothstein & Ebenstein

(57) ABSTRACT

The Invention provides golf balls formed from the cover compositions comprising a modified ionomer resin which is obtained by adding and reacting with a polyester oligomer in a zirconium complex and zirconia filled state to a typical ionomer resin, said ionomer resin being prepared by neutralizing a part of the unsaturated carboxylic acid with metals including zirconium, being addition polymerization with another ester by a radical reaction. A golf ball having a cover prepared from the compositions, the carry distance has increased in hitting the golf ball with a driver and excellency in back-spin property in hitting with a short iron, and the golf ball has a soft feeling with a durability, so that being got rid of a defect of a golf ball which has a cover composition comprising a conventional soft type ionomer resin, satisfying the golfers.

16 Claims, No Drawings

GOLF BALLS COVER COMPOSITIONS

FIELD OF THE INVENTION

The present invention relates to a cover composition with a excellent repulsive elasticity and back-spin property for golf balls.

BACKGROUND OF THE INVENTION

According to the structure, golf balls are classified into many types. For example, one-piece golf balls have a single structure made from a homogeneous mass of material, two-piece golf balls of a double structure consisting of solid matter in which a core is surrounded by a cover, solid type three-piece golf balls of a triple structure with a dual core consisting of an inner core and an outer layer covering the said inner core and a cover covering the said dual core, solid type three-piece golf balls of a triple strucure comprising a core and double cover in which an inner cover covering the said core and an outer cover covering the said inner cover, rubber thread wound three-piece golf balls of a triple structure comprising a rubber thread wound liquid or solid core is surrounded by a cover, four-piece golf balls of a quadruple structure comprising a triple core which is surrounded by a cover, four-piece golf balls of a quadruple structure comprising a dual core and double cover in which an inner cover covering the said dual core and an outer cover covering the said inner cover, four-piece golf balls of a quadruple structure comprising a core and triple cover which covered the said core, etc., golf balls have got more and more developed in many structures and variety of types in actuality. The reason why many types of golf balls are prepared as mentioned above, is said to be attributed to the fact that there have not yet been developed golf balls with which all golfers can be satisfied. In general, the golf ball which can give a satisfaction to golfers, that is the golf ball fly a great distance in hitting with a driver and excellency in back-spin property in hitting with a short iron, and soft enough to give a good impact feeling to the golfers in addition to being superior in durability.

When the golfer hit a golf ball with a golf club, a strong repulsive elasticity is generated on the ball by the impact force applied from the head of a golf club, bounding the ball at a high speed and thus making a carry distance with the aid of the back-spin due to the loft angle of the club head and the aerodynamic lifting force due to the dimples on the surface of the golf ball.

The important factors which determine the repulsive elasticity of golf ball are materials, their compositions, and the preparation methods for making the golf ball. The repulsive elasticity is much more affected by cores, such as single core, dual core, triple core, etc., than by covers in the solid type golf balls.

Likewise, rubber thread wound type golf ball's repulsive elasticity is more affected by a liquid center or solid core and the rubber threads wound around them than by covers. However, the cover or double cover of a golf ball plays a critical role in obtaining the back-spin needed when hitting a golf ball with a short iron club, in particular, the materials of the covers may determine the ball's function. Hereinafter, covers, double covers, triple covers are represented simply by covers. The materials of the covers of golf balls on the market are usually made from polymeric resins, such as ionomer resins, Balata rubber, polyurethane, polyetherester, polystyrene-polybutadiene block copolymer, other thermoplastics, or the mixtures thereof, or in combination with silicone resins, fluorine resins, etc. Among them, ionomer resins are the most frequently used. The ionomer resin covers show strong physical properties, but it is difficult to make a good golf ball by the reason of too hard to give a good impact feeling and the poor back-spin property in short iron shot.

In order to solve the problems, modified soft ionomer resins were developed and applied to many golf balls, however the covers made from the soft ionomer resins have so many problems, such as the surface of cover is easily damaged in hitting or significantly deteriorated the repulsive elasticity relative to the surface hardness. On the other hand, balata rubber, conventionally used as a cover material for rubber thread wound golf balls, which is superior in repusive elasticity and back-spin property, however the balata cover is poor in durability, the cover is torn or collapsed easily in hitting owing to the weak physical property. As for a polyurethane cover, it is superior in back-spin property, but the golf ball flies a significantly reduced distance in hitting with a driver owing to the poor repulsive elasticity, and the ball becomes too hard in the cold season to give the good feeling for the golfers. In addition, the molding process is too difficult to make a cover from polyurethane, the productivity is disadvantageous. Likewise, the other resins do not give remarkable advantages as cover materials for golf balls, and they have a lot of problems in many aspects.

Technical Assignment to be Achieved in this Invention

It is an object of the present invention to solve the above-mentioned problems of the covers in prior arts and to make a cover composition for golf balls which can fly a longer carry distance in hitting with a driver and have a superior back-spin property in short iron shot, and to provide a cover composition for golf balls which is superior in durability and gives the golfers a soft impact feeling.

DETAILED DESCRIPTION OF THE INVENTION

This invention provides a cover composition for golf balls which comprises a modified ionomer resin by adding and reacting with a polyester oligomer in a zirconium complex and zirconia-filled state which are catalysts in esterification reaction and dehydration reaction to a typical ionomer resin, said ionomer resin being prepared by neutralizing a part of the unsaturated carboxylic acid with metals including zirconium, being addition polymerization with another ester by a radical reaction, can be used as a cover material for golf balls, that is much better in repulsive elasticity and back-spin property than conventional cover materials. The polyester oligomer is highly viscous and named A-paste throughout the specification. In order to prepare the A-paste of the present invention, there are needed a polyol which has hydroxyl groups at opposite ends with a molecular weight ranging from 1,000 to 2,400, a bi- or tri-functional acrylic or methacrylic monomer and a zirconia, and an organic peroxide is used as a reaction initiator. The said polyol is selected from materials, such as polyester diol which can be derived from the reactants by polycondensation or ester exchange reaction of dibasic acid (such as adipic acid and sebasic acid) and diol (such as ethylene glycol, propylene glycol, butanediol and hexanediol), polyether diol which can be derived from the reactants by addition polymerization of epoxide and ethylene oxide (or butylene oxide), polytetramethyleneetherglycol which can be derived from the reactants by polymerization of polyalkylene oxide and tetrahydrofuran, or polydimethylsiloxanepolyoxyethylene diol, polycaprolactone diol, and polycarbonate diol, those polyols have hydroxyl groups at opposite ends with an average molecular weight of from 1,000 to 2,400. The said bi- or tri-functional acrylic or methacrylic monomer is selected from materials, such as ethylene diacrylate, ethylene dimethacrylate, 1,3-butyleneglycoldimethacrylate, acid, trimethylolpropane triacrylate and trimethylolpropane trimethacrylate. As for the zirconia, it is a zirconium oxide ($ZrO_2$) powder with an average particle size passable through 250 mesh sieve, whose crystal structure is partially stabilized by addition of yttrium oxide ($Y_2O_3$), calcium oxide(CaO) or magnesium oxide(MgO), and comprises hafnium oxide($HfO_2$) at an amount of 0.01~2%. Functioning as a reaction initiator, the organic peroxide is selected from materials, such as dicumylperoxide, 2,5-dimethylhexyl-2,5-di(peroxybenzoate), 1,1-di-tertiallybutyl-peroxy-3,3,5-trimethylcyclohexane, and bis(tertially-butylperoxyisopropyl)benzene.

The said ionomer resin is meant to be a resin comprising a three component type copolymer comprised an α-olefin, such as ethylene (or propylene) and an unsaturated carboxylic acid and at least a part of the carboxylic group forms a salt with a metal, or a four component type copolymer comprised an α-olefin and an unsaturated carboxylic acid and an ester of unsaturated carboxylic acid and at least a part of the carboxylic group forms a salt with a metal. Preferably used unsaturated carboxylic acid is mono-basic acid, such as acrylic acid and methacrylic acid, sometimes, di-basic acid, such as maleic acid and fumaric acid can be used. In ionomer resin, the content of the acid is represented by the weight % of the unsaturated carboxylic acid irrespective of whether it is neutralized or not, and is usually 6~20 weight %.

The metal, useful for neutralizing the unsaturated carboxylic acid comprises monovalent metal, such as sodium, lithium and potassium, and divalent metal, such as zinc and magnesium, and the neutralization degree of 20~80% by the metallic ion is commercially available. Useful ester of unsaturated carboxylic acid is an alkylester of unsaturated carboxylic acid, and the said alkyl group contains 1~10 carbon atoms and methyl, ethyl, propyl are proper for use.

A preparing process of the A-paste of the invention using the enumerated chemicals is as follows.

First, put a polyol having hydroxyl group at opposite ends with an average molecular weight of 1,000~2,400 into a proper sized vessel equipped with a stirrer and the bi- or tri-functional acrylic or methacrylic monomer is added at a mol ratio of 1.3~1.6 mol per mol of the polyol and mixed well 20~30 min.

Then, the zirconia powder is added slowly at an amount of 60~100 weight parts per 100 weight parts of the polyol while stirring at a speed of 200~300 r.p.m. Meanwhile, on the basis of 100 weight parts of the polyol, 2~3 weight parts of the organic peroxide is dissolved in 50~60 weight parts of an organic solvent, such as methylethylketone or toluene, and this organic peroxide solution is mixed with the above mixture little by little while stirring for 20~30 min.

Thereafter, the resulting solution is heated gradually for 1~1.2 hours with stirring, if the temperature reaches 100~110° C., the solution is cooled down to 60° C. with stirring. And again, the solution is warmed while stirring for 30 min., from the point where the temperature is elevated to 105° C., the reaction violently occurs, leading to a rapid elevation of temperature to 130° C. or higher.

By rapidly reducing this high temperature to 60° C. or less, a polyester oligomer in a metal complex and metal-filled state is obtained. This highly viscous A-paste should be reacted with an ionomer resin in a short time in order to produce a cover material suitable for the present invention, as follows.

100 weight parts of the A-paste are well mixed with 350~450 weight parts of the ionomer resin with the aid of a suitable mixer and then, the remaining organic solvent and volatiles are completely removed by maintaining the mixture at 60° C. for 2~4 hours in a dryer. The dried mixture of the A-paste and the ionomer resin is extruded at a screw speed of 200~300 r.p.m., maintaining the temperature at 200~240° C., from a nozzle of an extruder equipped with a pelletizer, and cooled to yield the primary pellets. Seperately, 150~300 weight parts of a fresh ionomer resin are mixed with additives, such as white pigment or other coloring pigments, antioxidants, organic or inorganic fillers containing metal, etc., and this ionomer resin is mixed with 100 weight parts of the primary pellets in a suitable mixer. This resulting mixture is again extruded in the same manner as in the above to give secondary pellets which can be used as a cover material for golf balls, in accordance with the present invention.

As occasion demands, the additives may be used or not. Optionally, the cover material prepared in accordance with the present invention may be used in combination with conventional cover materials, such as balata rubber, polyurethane, polyetherester, polystyrene-polybutadiene block copolymer, polyethylene-polystyrene-polybutadiene block copolymer, silicone resin, fluorine resin and other thermoplastic resins. When the material according to the present invention is applied for golf ball covers, any type of cores, for example, solid cores, dual cores, triple cores, liquid-containing solid cores, rubber thread wound liquid cores, rubber thread wound solid cores, may be used.

The golf balls, which have the covers prepared from the material of the present invention, fly a farther carry distance than do conventinal ones in hitting by a driver, and superior in back-spin property in hitting with a short iron, that control the ball with ease, and have a soft feeling with a improved durability, satisfying the golfers.

EXAMPLES 1–4 AND COMPARATIVE EXAMPLES 1–3

Using the compositions as indicated in Table 1, A-pastes, primary pellets and secondary pellets are prepared in the same manners as in the above. Golf balls are made by using the secondary pellets of Table 1 as cover materials and tested for various properties. The results are summarized in Table 2.

The cores for the golf balls are solid type cores with a diameter of 39.7 mm and the weight of all golf balls is adjusted by 45.3~45.6 gr., and the diameter of all golf balls is 42.7 mm. For Comparative Examples, typical ionomer resins which did not react with the A-paste, are used as cover materials while the same cores as those of Examples are used. The weight and diameter of the cores and golf balls used in the Comparative Examples are the same as in Examples. For convenience, the compositions of Examples and Comparative Examples are represented by weight parts.

TABLE 1

|  |  | Example | | | | Comparative Example | | |
| --- | --- | --- | --- | --- | --- | --- | --- | --- |
|  |  | 1 | 2 | 3 | 4 | 1 | 2 | 3 |
| A-Paste composition | | | | | | | | |
| PTMG 2000 | (1*) | 410 | | 200 | 640 | | | |
| Q4-3667 | (2*) | | 780 | 420 | | | | |
| SR-350 | (3*) | 100 | | 100 | | | | |
| SR-297 | (4*) | | 100 | | 100 | | | |
| Zirconia PG3 | (5*) | 300 | 480 | 420 | 440 | | | |
| TRIGONOX 29-40B-pd | (6*) | 10 | 19 | 15 | | | | |
| Primary Pellet composition | | | | | | | | |
| A-Paste | | 100 | 100 | 100 | 100 | | | |
| Surlyn 8320 | (7*) | 370 | | | | | | |
| Surlyn 9320 W | (8*) | | 200 | 380 | | | | |
| Surlyn AD8542 | (9*) | | 190 | | 360 | | | |
| Secondary Pellet composition | | | | | | | | |
| Primary Pellet | | 100 | 100 | 100 | 100 | | | |
| Surlyn 9910 | (10*) | 120 | 100 | 130 | 140 | 130 | 150 | 170 |
| Surlyn 9970 | (11*) | 20 | 20 | 20 | 20 | 20 | 20 | 20 |
| Surlyn 8320 | (7*) | 60 | 80 | 50 | 40 | 150 | 130 | 110 |
| TiO$_2$ (Titanium Dioxide) | (12*) | 6 | 6 | 6 | 6 | 6 | 6 | 6 |
| Irganox 1010 | (13*) | 0.6 | 0.6 | 0.6 | 0.6 | 0.6 | 0.6 | 0.6 |
| Irganox 1076 | (14*) | 0.6 | 0.6 | 0.6 | 0.6 | 0.6 | 0.6 | 0.6 |

TABLE 2

| Property | | Example 1 | Example 2 | Example 3 | Example 4 | Comparative Example 1 | Comparative Example 2 | Comparative Example 3 |
|---|---|---|---|---|---|---|---|---|
| Cover Surface Hardness (Shore D) | (15*) | 55 | 57 | 56 | 58 | 55 | 56 | 37 |
| Driver Distance (Yard) | (16*) | 237 | 235 | 238 | 241 | 229 | 230 | |
| #5 Iron Spin (r.p.m.) | (17*) | 6150 | 6060 | 6100 | 5960 | 5430 | 5370 | 5340 |
| #9 Iron Spin (r.p.m.) | (18*) | 8460 | 8210 | 8370 | 8150 | 7430 | 7280 | 7120 |
| Durability | (19*) | ⊚ | ○~⊚ | ⊚ | ⊚ | Δ~○ | Δ~○ | ○ |
| Feeling | (20*) | ○~⊚ | ○~⊚ | ○~⊚ | ○~⊚ | ○ | ○ | Δ~○ |

NOTE
(1*) PTMG 2000
Brand name of Polytetramethyleneetherglycol which is a kind of polyol with a molecular weight of 2,000, having hydroxyl groups at both ends, produced from Shinwha Petrochemical Co., Korea.
(2*) Q4-3667
Brand name of Polydimethylsiloxanepolyoxyethylene which is a kind of silicone polyol with a molecular weight of 2,400, having hydroxyl groups at both ends, produced from Dow Corning Co., U.S.A..
(3*) SR-350
Brand name of Trimethylolpropanetrimethacrylate which is a kind of tri-functional metacrylic monomer with a molecular weight of 338, produced from Sartomer Co., Inc. U.S.A..
(4*) SR-297
Brand name of 1,3-Butyleneglycoldimethacrylate which is a kind of di-functional methacrylic monomer with a molecular weight of 226, produced from Sartomer Co., Inc. U.S.A..
(5*) Zirconia PG3
Brand name of Zirconia which is a kind of zirconium oxide ($ZrO_2$) powder with an average particle size passable through 250 mesh sieve, whose crystal structure is partially stabilized by addition of yttrium oxide ($Y_2O_3$), produced from Insung Powder Tech. Co., Korea.
(6*) TRIGONOX 29-40B-pd
Brand name of 1,1-Di-tertiallybutylperoxy-3,3,5-trimethyl-cyclohexane which is a kind of organic peroxide stabilized with silica, 40% peroxide content, produced from Akzo Chemie Nederland.
(7*) Surlyn 8320
Brand name of a soft ionomer resin neutralized with sodium ion, produced from Dupont Co. U.S.A.
(8*) Surlyn 9320 W
Brand name of a soft ionomer resin neutralized with zinc ion, produced from Dupont Co. U.S.A.
(9*) Surlyn AD8542
Brand name of a soft ionomer resin neutralized with magnesium ion, produced from Dupont Co. U.S.A.
(10*) Surlyn 9910
Brand name of a hard ionomer resin neutralized with zinc ion, produced from Dupont Co. U.S.A.
(11*) Surlyn 9970
Brand name of a hard ionomer resin neutralized with zinc ion, produced from Dupont Co. U.S.A.
(12*) $TiO_2$ (Titanium dioxide)
White inorganic pigment.
(13*) Irganox 1010
Brand name of Pentaerythrytyl-tetrakis {3-(3,5-di-tertiallybutyl-4-hydroxyphenyl)-propionate} which is a kind of antioxidant and thermal stabilizer, produced from Ciba Geigy Co. Swiss.
(14*) Irganox 1076
Brand name of Octadecyl-3-(3,5-di-tertiallybutyl-4-hydroxyphenyl)-propionate which is a kind of antioxidant and thermal stabilizer, produced from Ciba Geigy Co. Swiss.
(15*) Cover Surface Hardness (Shore D)
Test method of German Industrial Standard DIN 53505 with a Hardness measuring instrument made by Zwick Co. in Germany, measuring a Hardness of outer cover surface of the golf balls, that the higher valued one is relatively with a high hardness.
(16*) Driver Distance (Yard)
Sum of a carry distance and a run distance of a golf ball when a titanium driver with a loft angle of 10.5 degree hit the golf ball at a head speed of 43 m/sec., with the aid of a mechanical golfer named IRON BYRON made by True Temper Sports Co. in U.S.A..
(17*) #5 Iron Spin (r.p.m.)
Values calculated in terms of r.p.m.(revolution per minute) of a golf ball, measured by photographing the back spin of the ball when a No. 5 iron club with a loft angle of 30 degree hit the ball at a head speed of 36 m/sec., with the aid of the same golfer as in Note 16.
(188) #9 Iron Spin (r.p.m.)
Values calculated in terms of r.p.m.(revolution per minute) of a golf ball, measured by photographing the back spin of the ball when a No. 9 iron club with a loft angle of 45 degree hit the ball at a head speed of 30 m/sec., with the aid of the same golfer as in Note 16.

TABLE 2-continued

|  | Example | | | | Comparative Example | | |
|---|---|---|---|---|---|---|---|
| Property | 1 | 2 | 3 | 4 | 1 | 2 | 3 |

(19*) Durability
Measuring the injured degree of a golf ball by shooting a ball 50 times to a club head fixed on 2 Cm thickness steel plate which is 2.54 meters away from the shooting machine named Air Cannon made by K-Lin Specialties, Inc. in U.S.A.,
◉ the surface of the golf ball was somewhat scratched however a printing marker remained.
o the surface of the golf ball was heavily scratched with the printing marker being destroyed.
Δ the cover of the golf ball was seriously damaged.
X the cover of the golf ball was broken.
(20*) Feeling
evaluated by 5 professional golfers who have practically rounded the golf course, which represents as ◉ Excellent, o Good, Δ Moderate, X Poor.

Effect of the Invention

As apparent from the data of Table 2, a golf ball having a cover prepared from the material of the present invention, fly a farther carry distance in hitting by a driver, and superior in back-spin property in hitting with a short iron than do conventional ones which have a similar hardness of the cover, so that the golfers can control the golf ball with ease. Further, the golf balls have a soft feeling with a improved durability, satisfying the golfers.

What is claimed is:

1. A cover composition for golf balls, which comprises an ionomer resin and a polyester oligomer in a zirconium complex and zirconia-filled state, the ionomer resin being prepared by neutralizing a part of the unneutralized portion of the unsaturated carboxylic acid of ionomer resin with another metal including zirconium of ionomer resin and by addition polymerization of an unsaturated carboxylic acid of ionomer resin with polyester oligomer.

2. The cover composition of claim 1, wherein the polyester oligomer in a zirconium complex and zirconia filled state is prepared by mixing and reacting a polyol with a molecular weight of 1,000~2,400 which has hydroxyl groups at both ends, a bi- or tri-functional acrylic monomer or methacrylic monomer, and zirconia.

3. The cover composition of claim 2, wherein the said polyol is selected from the group consisting of a polyester diol, a polyether diol, a polytetramethyleneetherglycol, a polydimethylsiloxanepolyoxyethylene diol, a polycaprolactone diol and a polycabonate diol;
said polyester diol being prepared from dibasic acids and diols by polycondensation reaction or ester exchange reaction,
said polyether diol being prepared by adding epoxide to ethyleneoxide or butyleneoxide,
said polytetramethyleneetherglycol being prepared by polymerizing polyalkyleneoxide with tetrahydrofuran.

4. The cover composition of claim 2, wherein the bi- or tri-functional acrylic or methacrylic monomer is selected from the group consisting of ethylenediacrylate, ethylenedimethacrylate, 1,3-butylengylcoldimethacrylate, trimethylolpropanetrimethacrylate and trimethylolpropanetriacrylate.

5. The cover composition of claim 2, wherein the zirconia is zirconium oxide ($ZrO_2$) powder with an average particle size passable through 250 mesh sieve, whose crystal structure is partially stabilized by addition of yttrium oxide $Y_2O_3$), calcium oxide (CaO) or magnesium oxide (MgO), and comprises hafnium oxide ($HfO_2$) at an amount of 0.01~2%.

6. The cover composition of claim 1, wherein said ionomer resin is a resin comprising a three component type copolymer including an α-olefin, an unsaturated carboxylic acid and an unsaturated carboxylic acid having at least a part of the carboxylic group forming a salt with a metal, or a four component type copolymer including an α-olefin, an unsaturated carboxylic acid, an ester of an unsaturated carboxylic acid and an unsaturated carboxylic acid having at least a part of the carboxylic group forming a salt with a metal.

7. The cover composition of claim 6, wherein the unsaturated carboxylic acid is a monobasic acid or a dibasic acid.

8. The cover composition of claim 6, wherein said ester of an unsaturated carboxylic acid is an alkyl ester of a monobasic or dibasic unsaturated carboxylic acid, the alkyl moiety containing 1~10 carbon atoms.

9. The cover composition of claim 6, wherein said metal salt of unsaturated carboxylic acid is an unsaturated carboxylic acid neutralized with a monovalent or divalent metal.

10. A golf ball having a single structure cover, said cover being the cover composition of claim 1.

11. A golf ball having a double structure cover comprising an outer cover and an inner cover, wherein said outer cover is the cover composition of claim 1.

12. A golf ball having a triple structure cover comprising an outer cover, an intermediate cover and an inner cover, wherein said outer cover is the cover composition of claim 1.

13. The cover composition of claim 3, wherein said dibasic acids are adipic acid, sebasic acid or combinations thereof, and said diols are ethyleneglycol, propylene-glycol, butanediol, hexanediol or combinations thereof.

14. The cover composition of claim 6, wherein said α-olefin is ethylene, propylene or combinations thereof.

15. The cover composition of claim 7, wherein said monobasic acid is acrylic acid, methacrylic acid or combinations thereof, and said dibasic acid is maleic acid, fumaric acid or combinations thereof.

16. The cover composition of claim 9, wherein said monovalent metal is sodium, lithium, potassium or combinations thereof, and said divalent metal is zinc, magnesium or combinations thereof.

* * * * *

UNITED STATES PATENT AND TRADEMARK OFFICE
CERTIFICATE OF CORRECTION

PATENT NO. : 6,242,521 B1
DATED : June 5, 2001
INVENTOR(S) : In Hong Hwang

It is certified that error appears in the above-identified patent and that said Letters Patent is hereby corrected as shown below:

Title page,
Item [73], Assignee, change "Volvic Inc." to -- Volvik Inc. --

Signed and Sealed this

Nineteenth Day of February, 2002

Attest:

JAMES E. ROGAN
Attesting Officer
Director of the United States Patent and Trademark Office